No. 851,305. PATENTED APR. 23, 1907.
E. H. McLAUGHLIN & E. S. SITTEL.
HEADLIGHT.
APPLICATION FILED JAN. 4, 1906.

Attest
E. B. Lehman
Walter H. Riedel.

Inventors
E. H. McLaughlin and
E. S. Sittel
by Kirby, Atty.

UNITED STATES PATENT OFFICE.

EDWARD H. McLAUGHLIN AND EDWARD S. SITTEL, OF PARSONS, KANSAS.

HEADLIGHT.

No. 851,305.      Specification of Letters Patent.      Patented April 23, 1907.

Application filed January 4, 1906. Serial No. 294,611.

*To all whom it may concern:*

Be it known that we, EDWARD H. McLAUGHLIN and EDWARD S. SITTEL, citizens of the United States, residing at Parsons, in the county of Labette and State of Kansas, have invented certain new and useful Improvements in Headlights; and we do declare the following to be a full, clear, and exact description of the invention, such as will enable others skilled in the art to which it appertains to make and use the same.

This invention relates to locomotive headlights, and has for its object, first, to provide an indicator or numbering device which shall be independent of the headlight case and separable therefrom, so that it may readily be removed from one headlight and attached to another; second, to provide an indicator-hood capable of displaying the number of the locomotive, or other information from one or more sides of the hood, and adapted to be illuminated by light from within the case passing through the front glass thereof, the said hood having no communication with the interior of the headlight, and third, to provide such independent hood with a reflecting surface arranged to reflect the upward rays of light, which would otherwise be wasted, down in front of the locomotive to illuminate the track immediately in front thereof, thus enabling the engineer, when the locomotive is running through yards, to see the condition of frogs and switches.

The foregoing and other objects are attained by means of the construction illustrated in the accompanying drawings, in which:—

Figure 1:
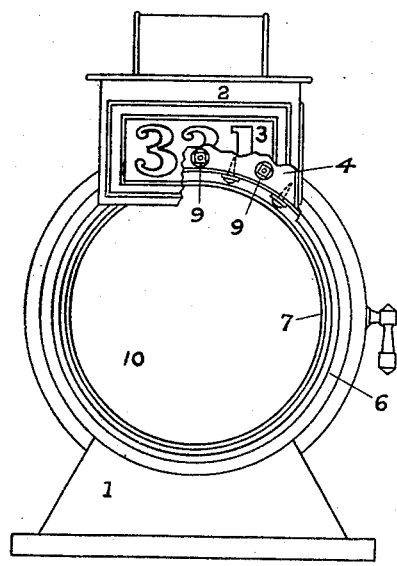
Figure 2:
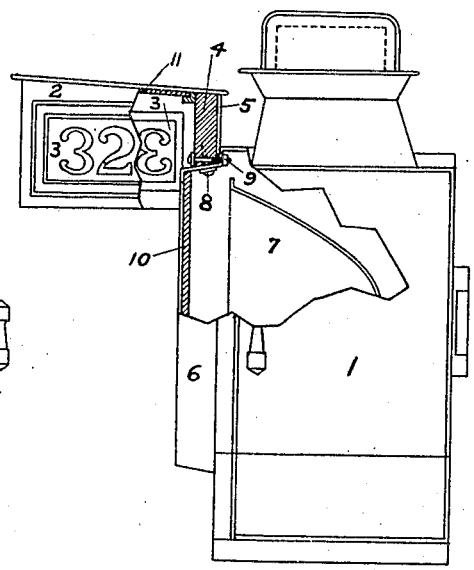
Figure 3:
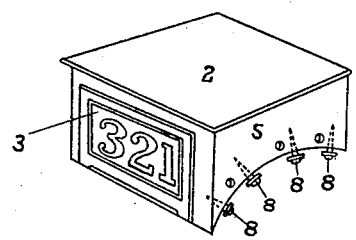

Figure 1 is a front view of a headlight with our improved signal-chamber attached thereto, part of the front wall being broken away to show the manner in which the chamber is secured to the headlight case; Fig. 2 is a side view of the same partly in elevation and partly in section, and showing a portion of the reflector within the case; Fig. 3 is a perspective view of the signal-chamber detached from the headlight case.

In the said drawings similar reference numbers indicate corresponding parts in all the figures thereof.

1 designates a headlight case which may be of the usual or any suitable construction and having a front projecting rim 6 adapted to carry a lens or glass disc 10 through which light from the headlight burner is reflected by means of a reflector 7, all of which is common to locomotive headlights as heretofore constructed. At the upper part of the headlight case and resting upon the said front rim thereof is mounted a box-like display device (commonly termed signal-chamber) 2, the rear wall of which is formed to suit the diameter of the said rim upon which it rests and to which it is secured as hereinafter described. This chamber projects forward of the body of the headlight and is disposed at right-angles to the lens or disc 10; the bottom of the chamber is open to permit the rays of light which are reflected upward and outward by the reflector within the case to enter the same and illuminate signal plates 3, held in the front and side vertical walls of the chamber and in which walls openings are cut to accommodate the same as is usual in various forms of signal devices used in connection with locomotive headlights; it is obvious, however, that the bottom of the chamber may be closed by a glass plate, but in practice we have found this to be unnecessary. Secured on the inside of the rear wall 5, of the chamber is a wood block 4, to receive screws 8 which pass through the front rim 6, and through the wood block 4 and the front of the case body bolts 9 are passed and in this manner the chamber is firmly secured to the case as shown in the drawing.

Modern built locomotives are of such large proportions and are so high that the headlight, being mounted at the top of the boiler extension, does not illuminate the track for a considerable distance ahead of the locomotive, in order to utilize the upward rays of light, which have heretofore been wasted, for the purpose of illuminating the track immediately in front of the locomotive so that when passing through yards and other places, where there are frogs and switches the engineer may be able to more clearly observe the condition and position of same, we place on the underside of the top wall of the chamber a reflector 11, arranged in such relative position as to reflect the light downward, and by this means accomplish a most desirable result. It is obvious, however, that the said top wall may be suitably inclined, as shown in Fig. 2, and may of itself form said reflector.

From the foregoing it will be observed that our improved signal-chamber is entirely independent of and separable from the headlight case; that there is no open communication with the interior of the case; that an attachment for headlights, in accordance with our invention can be readily attached to headlights as at present constructed, or in other words that our improved signal-chamber can be supplied as an article complete in itself and attached to headlights already in service; that by arranging the signal character p ates in the manner described and shown much more powerful illumination thereof is obtained and the signal characters thereby made more distinct and visible at a greater distance, and that it not only indicates the number of the locomotive or gives other information, but also improves the efficiency of the headlight by utilizing wasted rays of light to light the track in front of the locomotive, where with systems heretofore employed a dark space exists, and that various changes in the form, proportion and minor details of construction may be resorted to without departing from the principle or sacrificing any of the advantages of our invention.

We are aware that it is not broadly new to mount a signal-chamber in front and independent of the headlight, such for example as is shown in United States Letters Patent No. 270,792 in which the light enters the chamber at the rear and by means of a reflector in the bottom thereof, is directed upward and then, by other reflectors, outward against the signals to be illuminated, and we do not claim such construction broadly.

Having thus fully described our invention we claim—

1. In combination with an illuminating device having a lens; of a signal display device fixed with respect to the illuminating device and comprising a box-like body arranged at one side of and extending forward of and at a right angle to the lens; the said body being open at its longitudinal side nearest the lens throughout its area in front of the lens, whereby the light which has passed through the lens is enabled to illuminate the interior of the body, and having an upright wall provided with an illuminated signal, as and for the purpose set forth.

2. In combination with a headlight case having a reflector and a lens therein, an attachment therefor comprising an independent signal-chamber having one or more of its vertical side walls provided with signal-characters, the said chamber being secured to and projecting forward of the case and having an open bottom in front of the lens, whereby the said signal-characters are illuminated by light reflected directly into the chamber by the reflector within the case.

3. In combination with a headlight case having a reflector and a lens therein, an attachment therefor comprising an independent signal-chamber having one or more of its vertical side walls provided with signal-characters, the said chamber being secured to and projecting forward of the case and having an open bottom in front of the lens, whereby the said signal-characters are illuminated by light reflected directly into the chamber by the reflector within the case, and a reflector located on the underside of the top of the chamber whereby the light therein is reflected upon the track immediately in front of the locomotive.

4. In combination with a headlight case having a reflector and a lens therein, a signal-chamber open at its bottom side in front of the lens and mounted upon the front projecting rim of the case and extending forward thereof, and signal-characters located in one or more of the vertical side walls of the chamber and illuminated by light reflected directly into the chamber through the open bottom thereof by the reflector within the case.

5. In combination with a headlight case having a reflector and a lens therein, a signal-chamber open at its bottom side in front of the lens and mounted upon the front-projecting rim of the case and extending forward thereof, signal-characters located in one or more of the vertical side walls of the chamber and illuminated by light reflected directly into the chamber through the open bottom thereof by the reflector within the case, and a reflector located on the underside of the top of the chamber whereby the light therein is reflected upon the track immediately in front of the locomotive.

6. In combination with a headlight case having a reflector and a lens therein, an attachment therefor comprising an independent signal-chamber having an open bottom in front of said lens mounted upon the front projecting rim of the case and extending forward thereof, and signal-characters located in one or more of the vertical side walls of said chamber illuminated by light reflected directly into the chamber by the reflector within the case.

7. In combination with a headlight case having a reflector and a lens therein, an attachment therefor comprising an independent signal-chamber having an open bottom in front of said lens mounted upon the front projecting rim of the case and extending forward thereof, signal-characters located in one or more of the vertical side walls of said chamber illuminated by light reflected directly into the chamber by the reflector within the case, and a reflector located on the underside of the top of the chamber whereby the light therein is reflected upon the track immediately in front of the locomotive.

8. A new article of manufacture for attachment to locomotive headlights comprising a signal-chamber having a closed top and an open bottom and some of whose vertical side walls carry signal-characters adapted to be illuminated by light reflected into the chamber direct from the reflector within the headlight case when said chamber is mounted thereon.

9. A new article of manufacture for attachment to locomotive headlights comprising a signal-chamber having a closed top and an open bottom and some of whose vertical side walls carry signal-characters adapted to be illuminated by light reflected into the chamber direct from the reflector within the headlight case when said chamber is mounted thereon, and a reflector located on the underside of the top of the chamber whereby the light therein is reflected upon the track immediately in front of the locomotive.

In testimony whereof we have hereunto set our hands in presence of two subscribing witnesses.

EDWARD H. McLAUGHLIN.
EDWARD S. SITTEL.

Witnesses:
CHARS. SCHMOCK,
GEO. K. RATLIFF.